(No Model.) 13 Sheets—Sheet 2.

L. GENTY.
AEROTHERMIC MOTOR.

No. 508,301. Patented Nov. 7, 1893.

Witnesses  Inventor (No Model.)  13 Sheets—Sheet 4.

L. GENTY.
AEROTHERMIC MOTOR.

No. 508,301.  Patented Nov. 7, 1893.

(No Model.) 13 Sheets—Sheet 5.
L. GENTY.
AEROTHERMIC MOTOR.
No. 508,301. Patented Nov. 7, 1893.

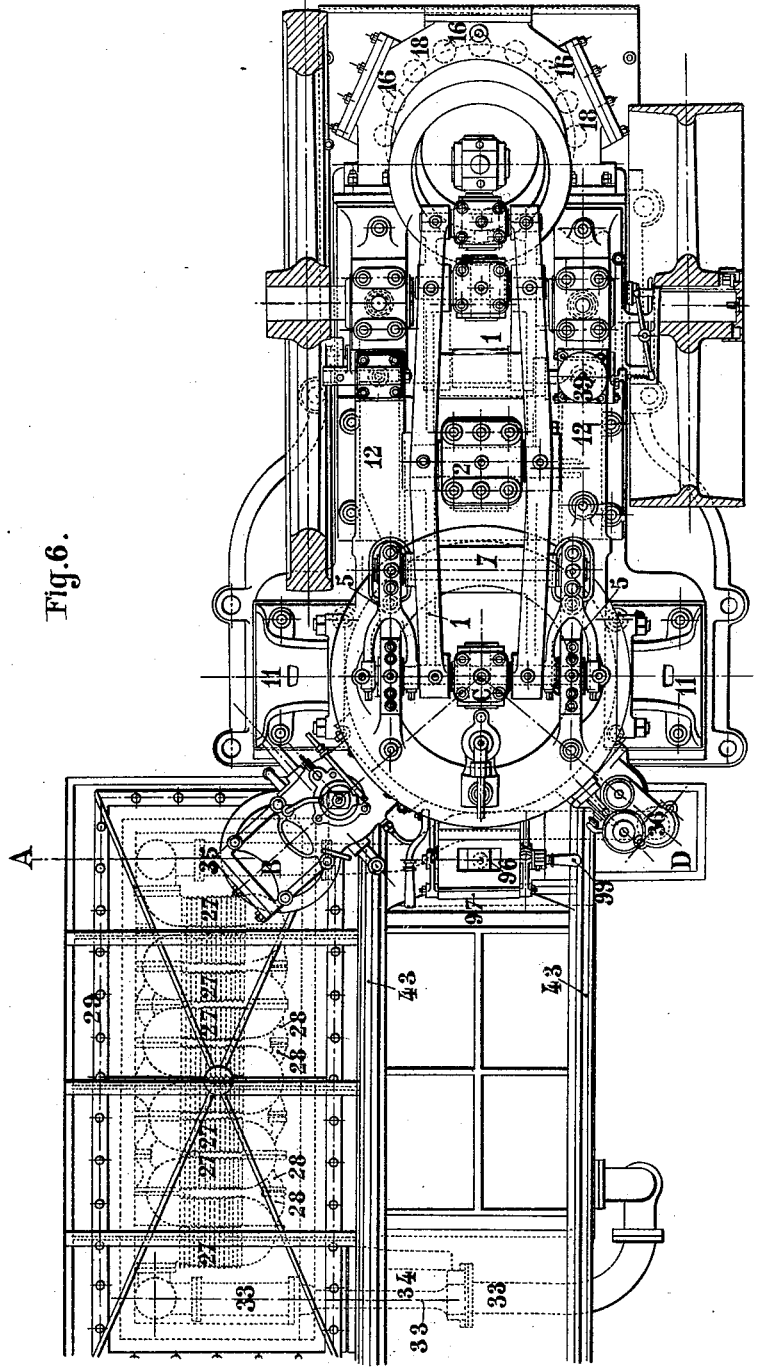

(No Model.) 13 Sheets—Sheet 7.
L. GENTY.
AEROTHERMIC MOTOR.
No. 508,301. Patented Nov. 7, 1893.
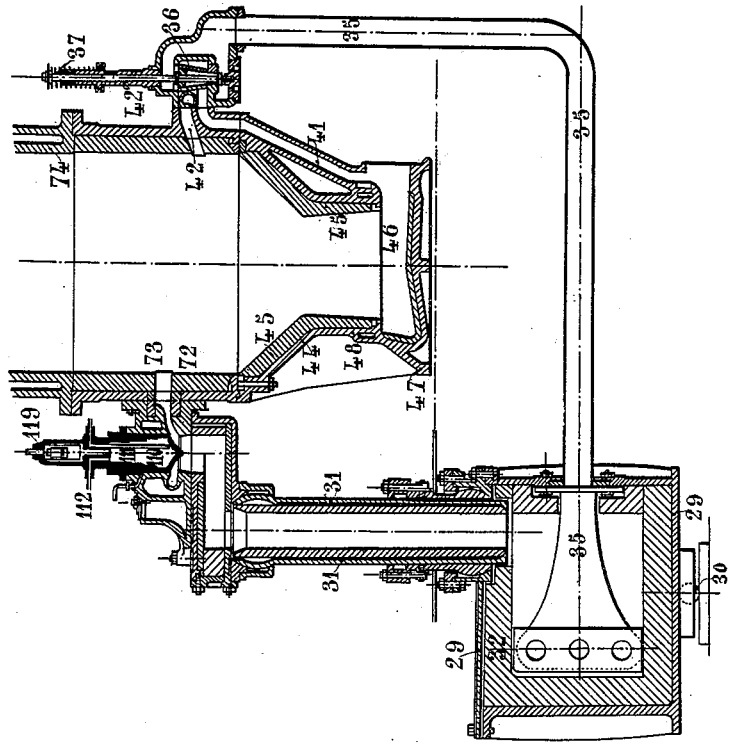
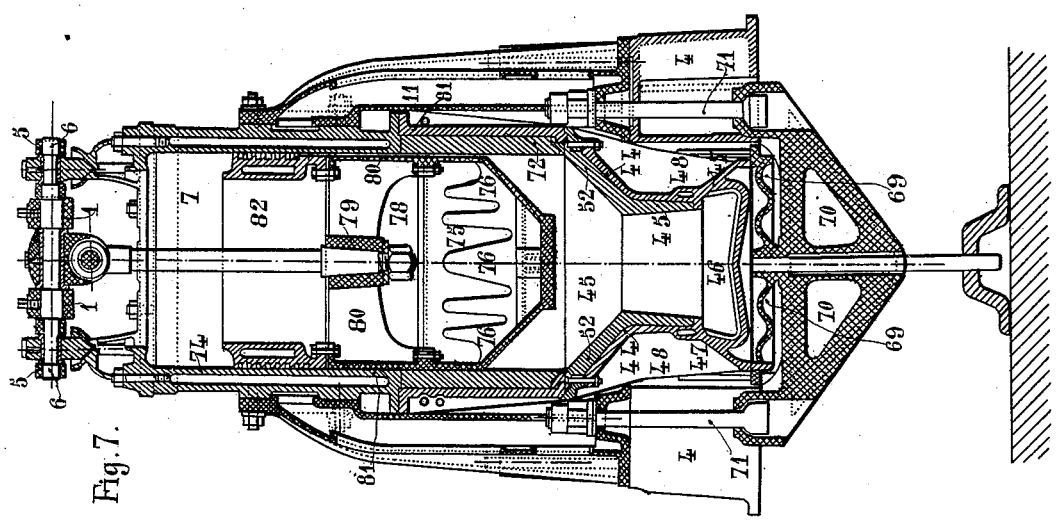

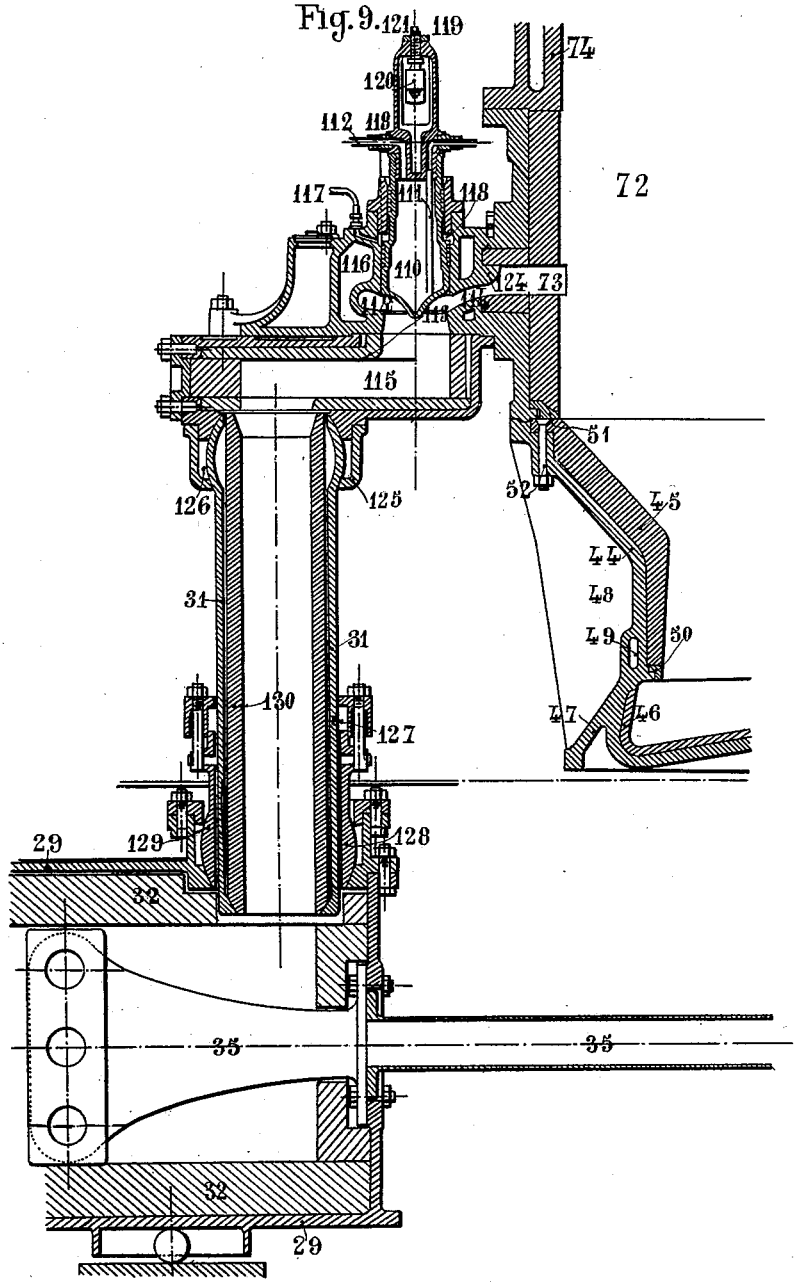

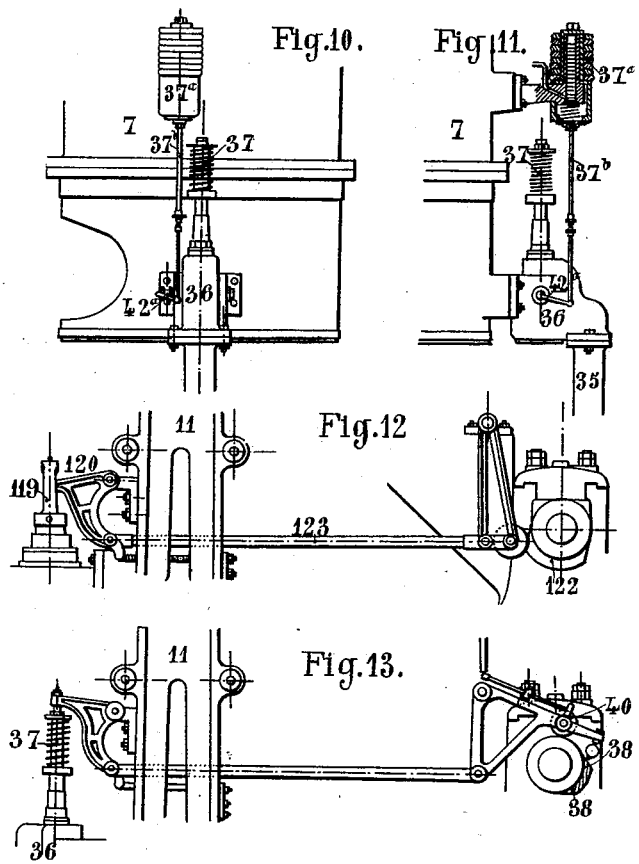

(No Model.) 13 Sheets—Sheet 10.
L. GENTY.
AEROTHERMIC MOTOR.
No. 508,301. Patented Nov. 7, 1893.
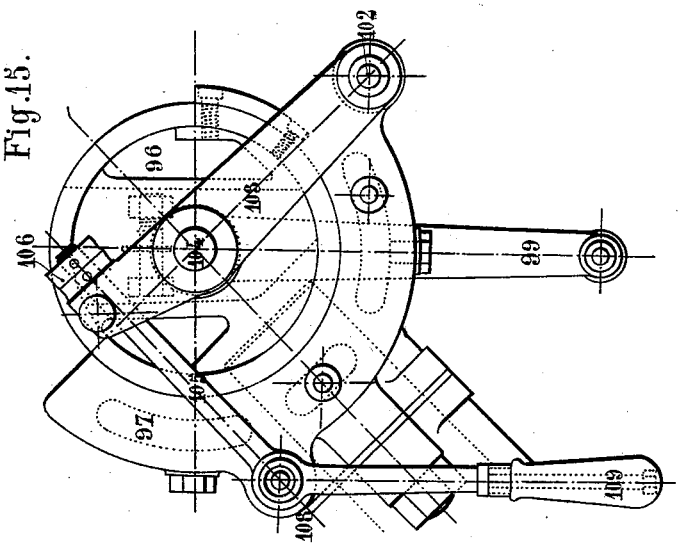
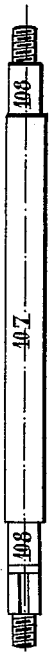
Fig.17.
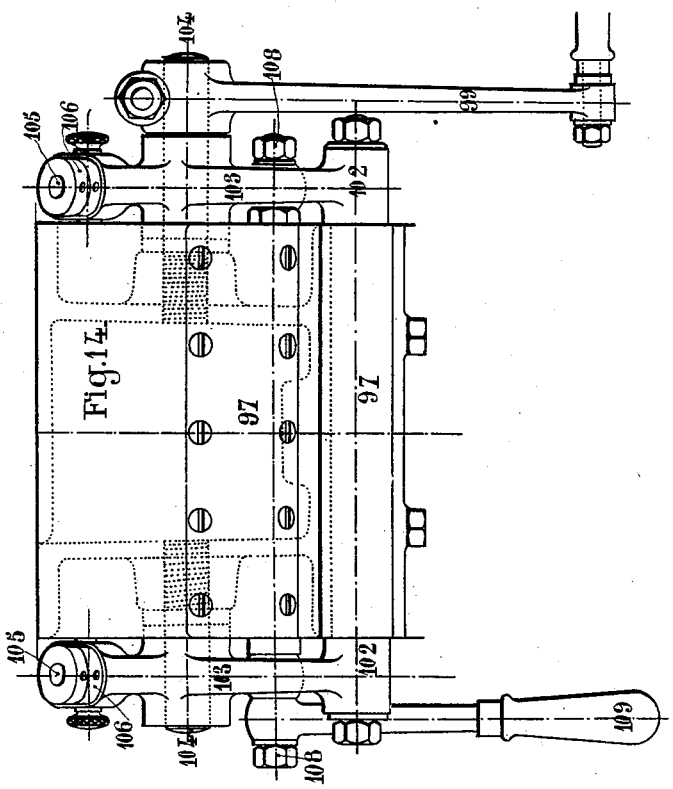
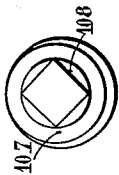
Fig.16.
Witnesses
J. A. Rutherford.
Robert Emmett.
Inventor
Lucien Genty.
By James L. Norris
Attorney.

(No Model.) 13 Sheets—Sheet 11.
L. GENTY.
AEROTHERMIC MOTOR.
No. 508,301. Patented Nov. 7, 1893.
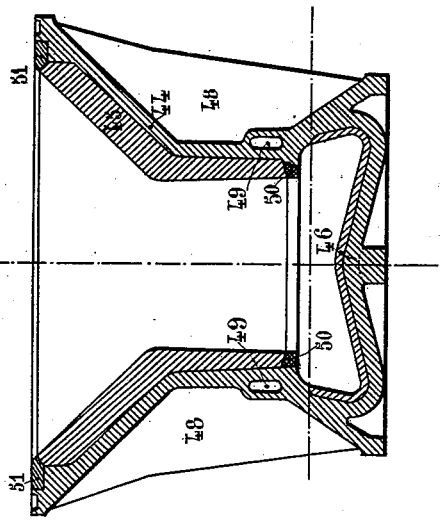
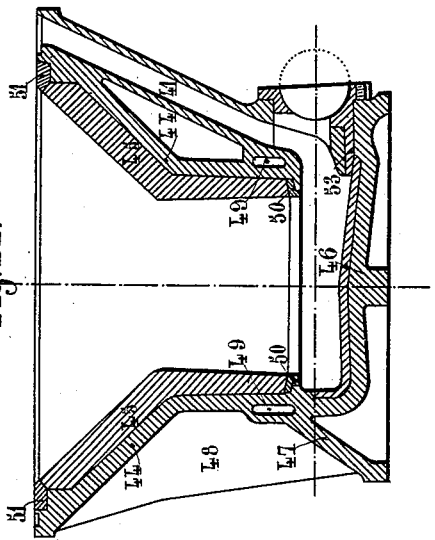
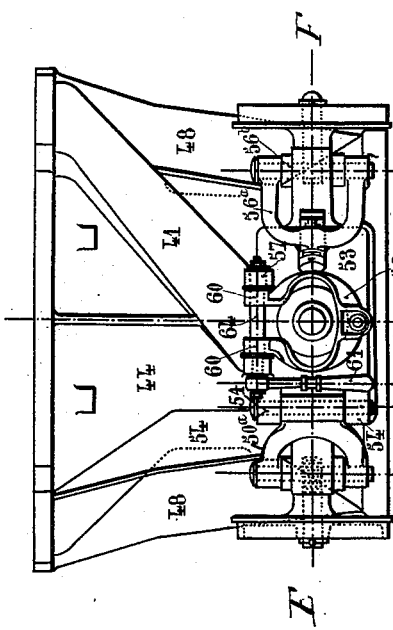
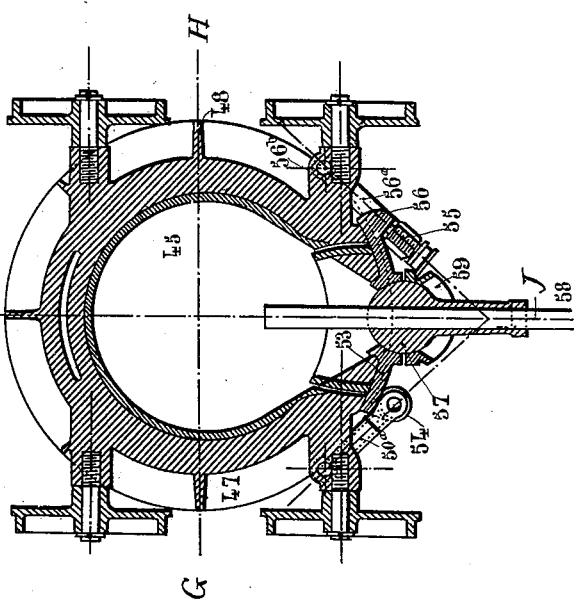
Witnesses: J. A. Rutherford, Robert Everett.
Inventor: Lucien Genty. By James L. Norris, Attorney.

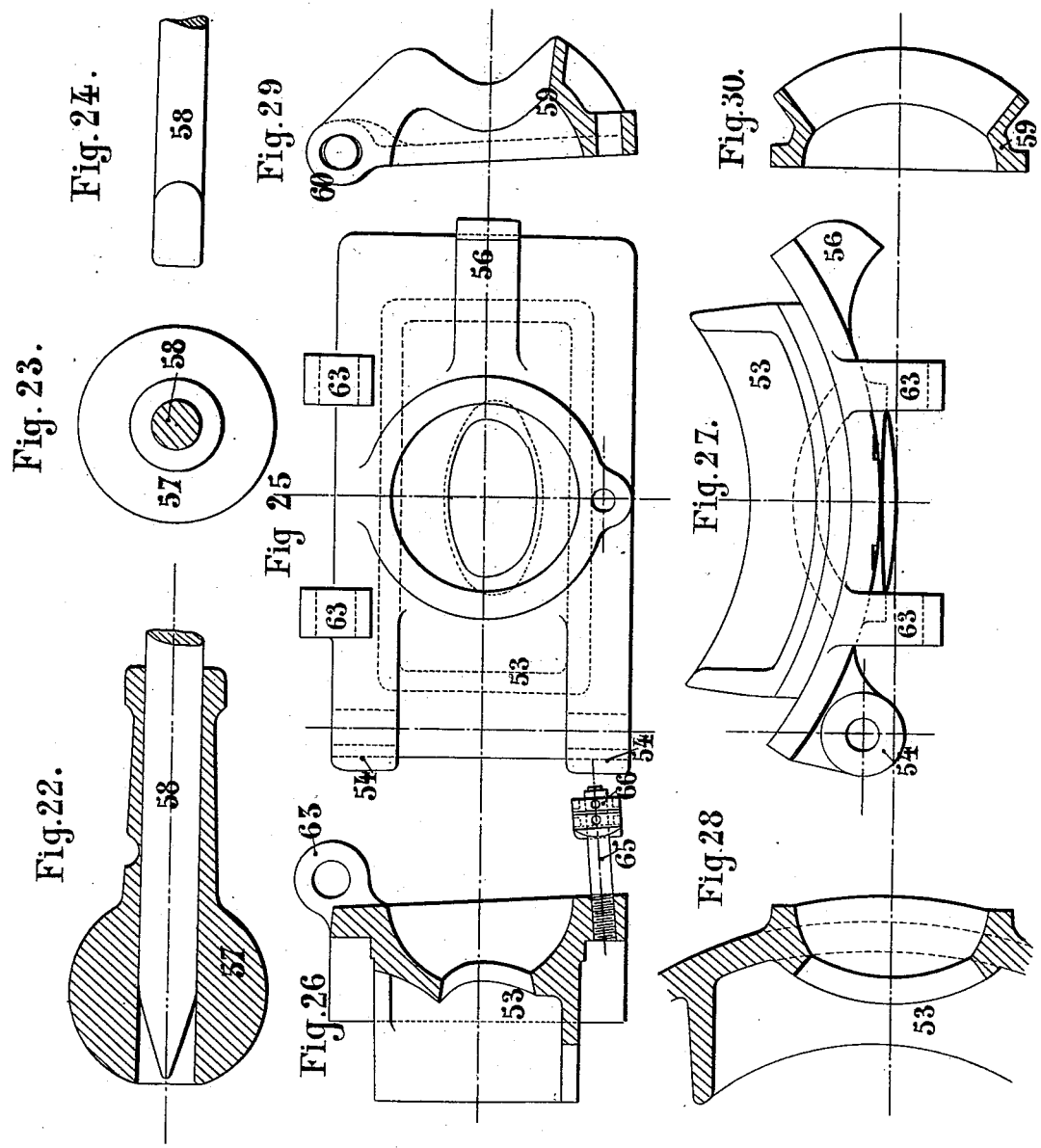

(No Model.)  L. GENTY.  13 Sheets—Sheet 13.
AEROTHERMIC MOTOR.
No. 508,301.  Patented Nov. 7, 1893.
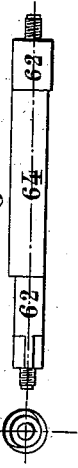
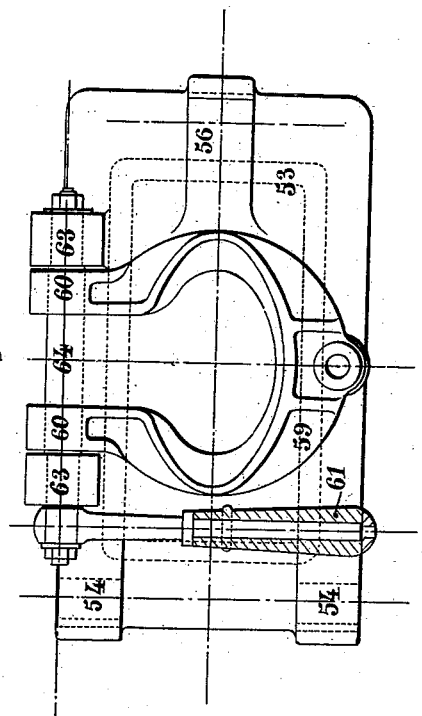
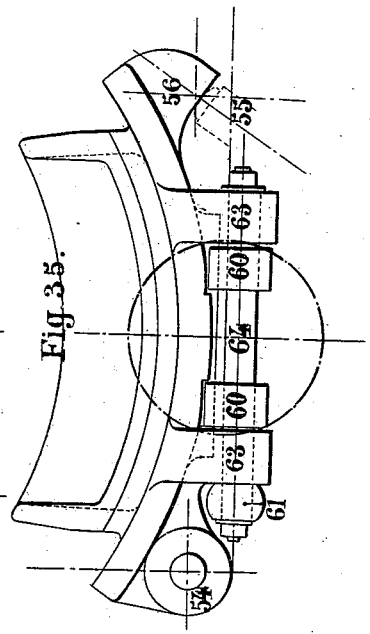
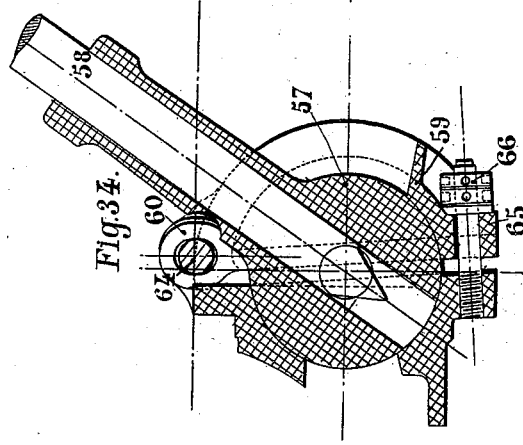
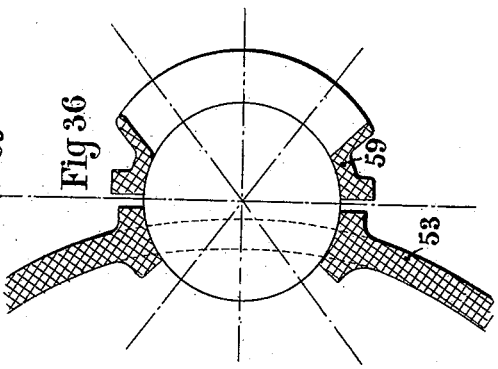

UNITED STATES PATENT OFFICE.

LUCIEN GENTY, OF TOURS, FRANCE.

AEROTHERMIC MOTOR.

SPECIFICATION forming part of Letters Patent No. 508,301, dated November 7, 1893.

Application filed August 12, 1892. Serial No. 442,937. (No model.)

*To all whom it may concern:*

Be it known that I, LUCIEN GENTY, a citizen of France, and a resident of Tours, in the Department of Indre-et-Loire, France, have invented a new and useful Improvement in Aerothermic Motors, of which the following is a specification.

My invention has for its object the removal of the disadvantages which have heretofore prevented hot air motors from coming into general use.

As hereinafter explained in detail my invention consists in improvements relating to the following parts namely:—the construction of the furnace or combustion chamber which is rendered capable of being easily removed and enables the fuel to be consumed without a grate, the arrangement of a poker or instrument for stirring or clearing the fire, the construction of an improved escape valve capable of withstanding the destructive action of the flame and dust; the employment of a jointed escape pipe admitting of free expansion of the parts, the application of an improved heat regenerator with provision for expansion, and improvements in the construction of the apparatus for introducing the fuel into the combustion chamber. By means of these several improvements and by combining the same I am enabled to construct a hot air engine capable of being employed with great advantage in practice; and in order that my said invention may be fully understood I shall now proceed more particularly to describe the same and for that purpose shall refer to the several figures on the annexed sheets of drawings the same figures of reference indicating corresponding parts in all the figures.

Figure 1:
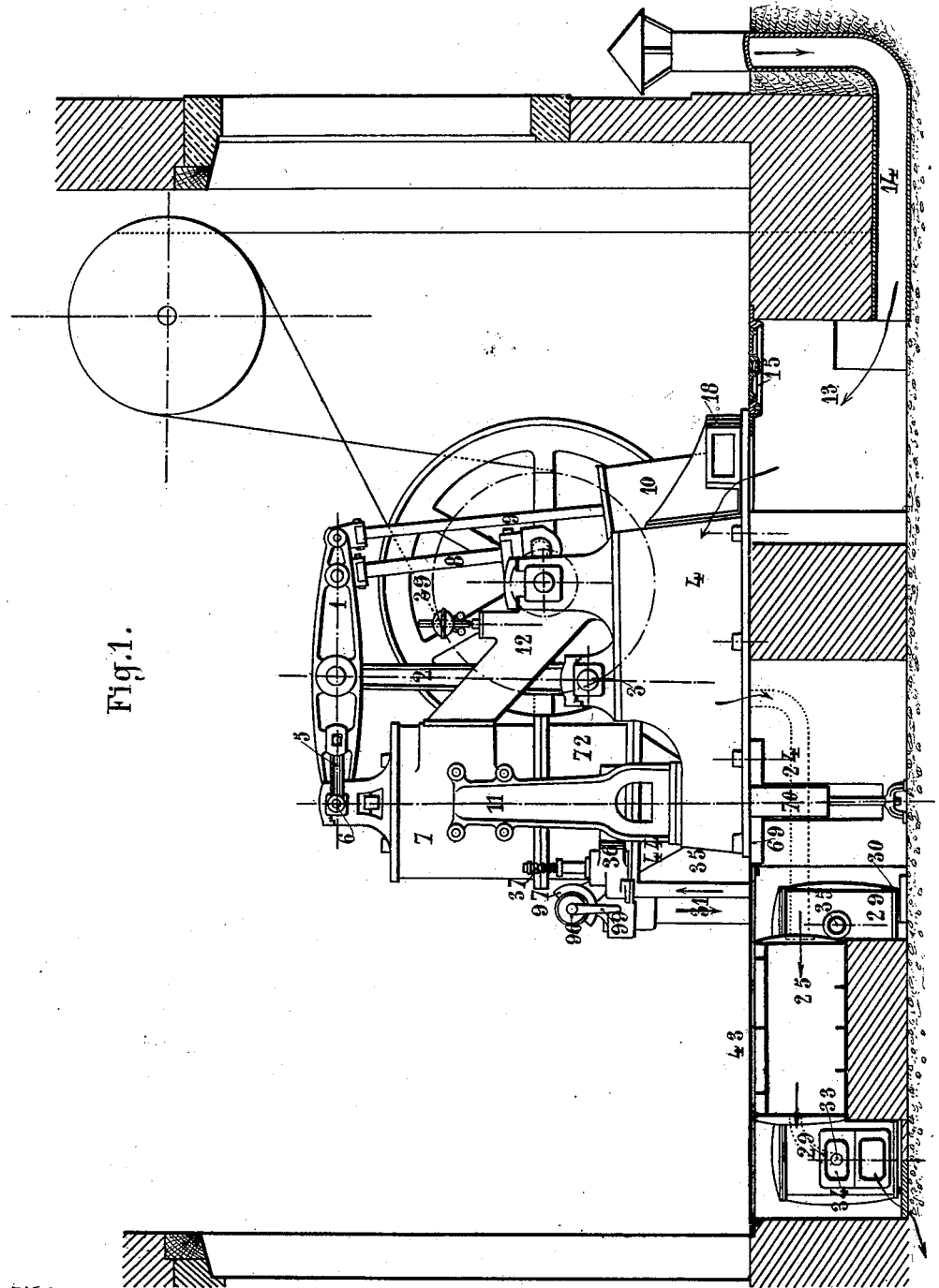
Figure 2:
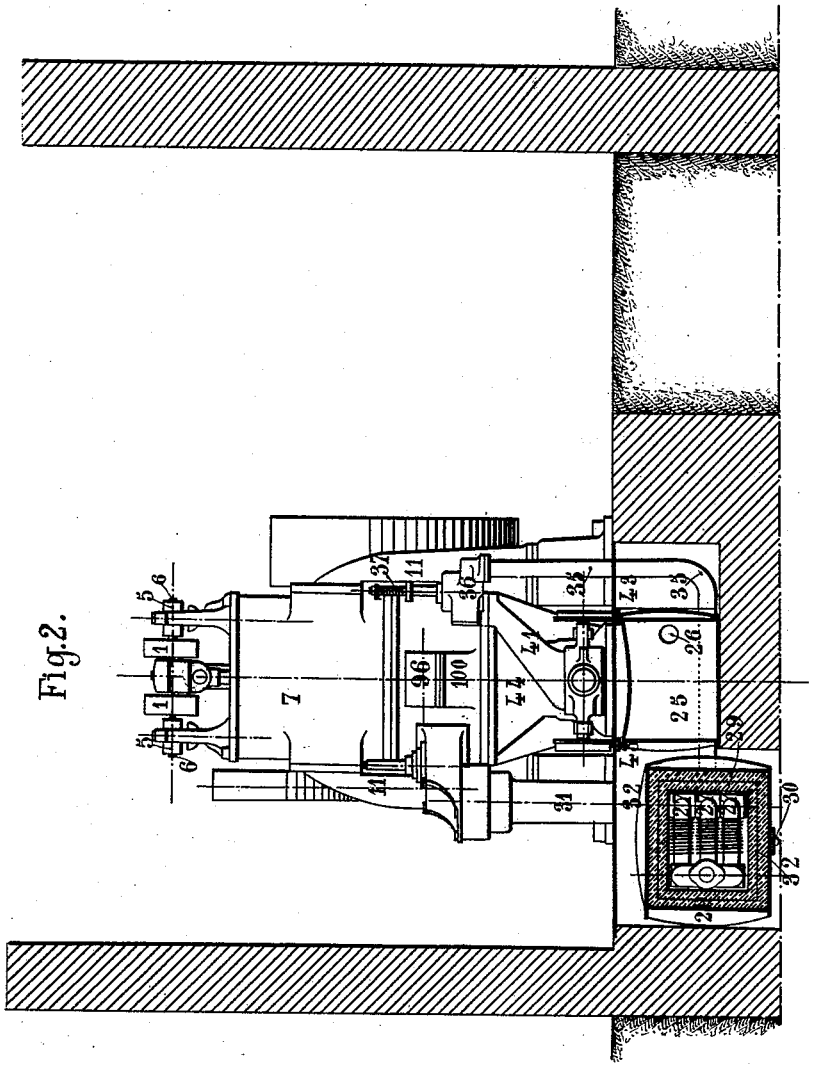
Figure 3:
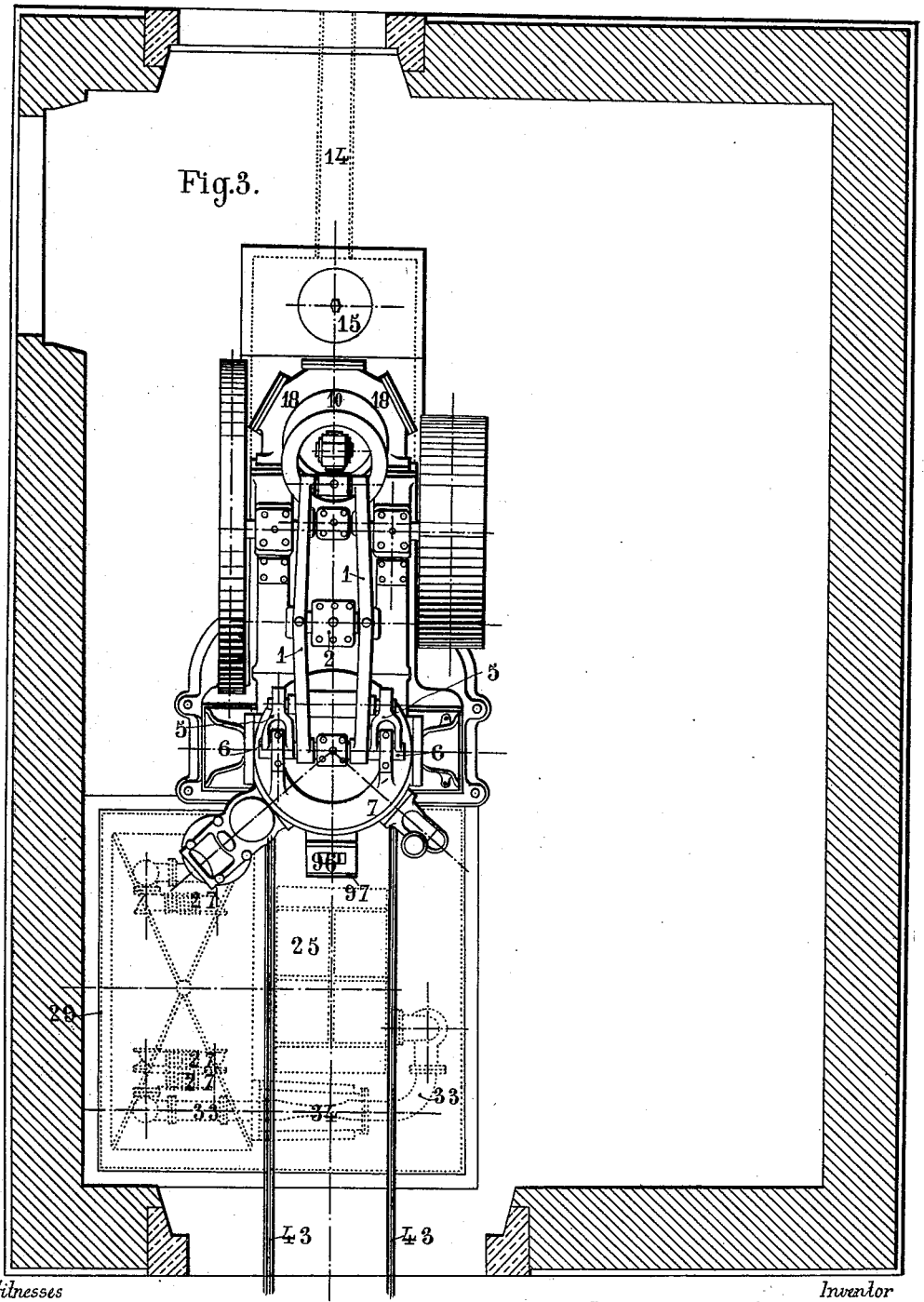
Figure 4:
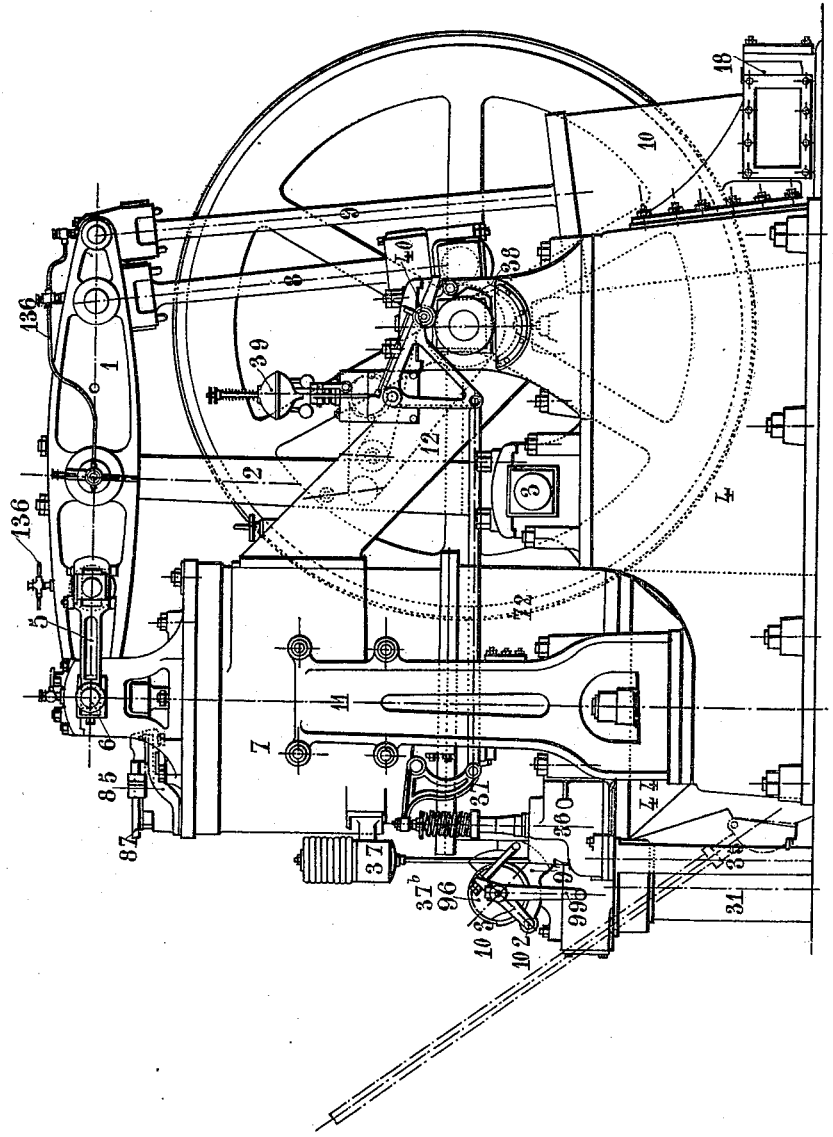
Figure 5:
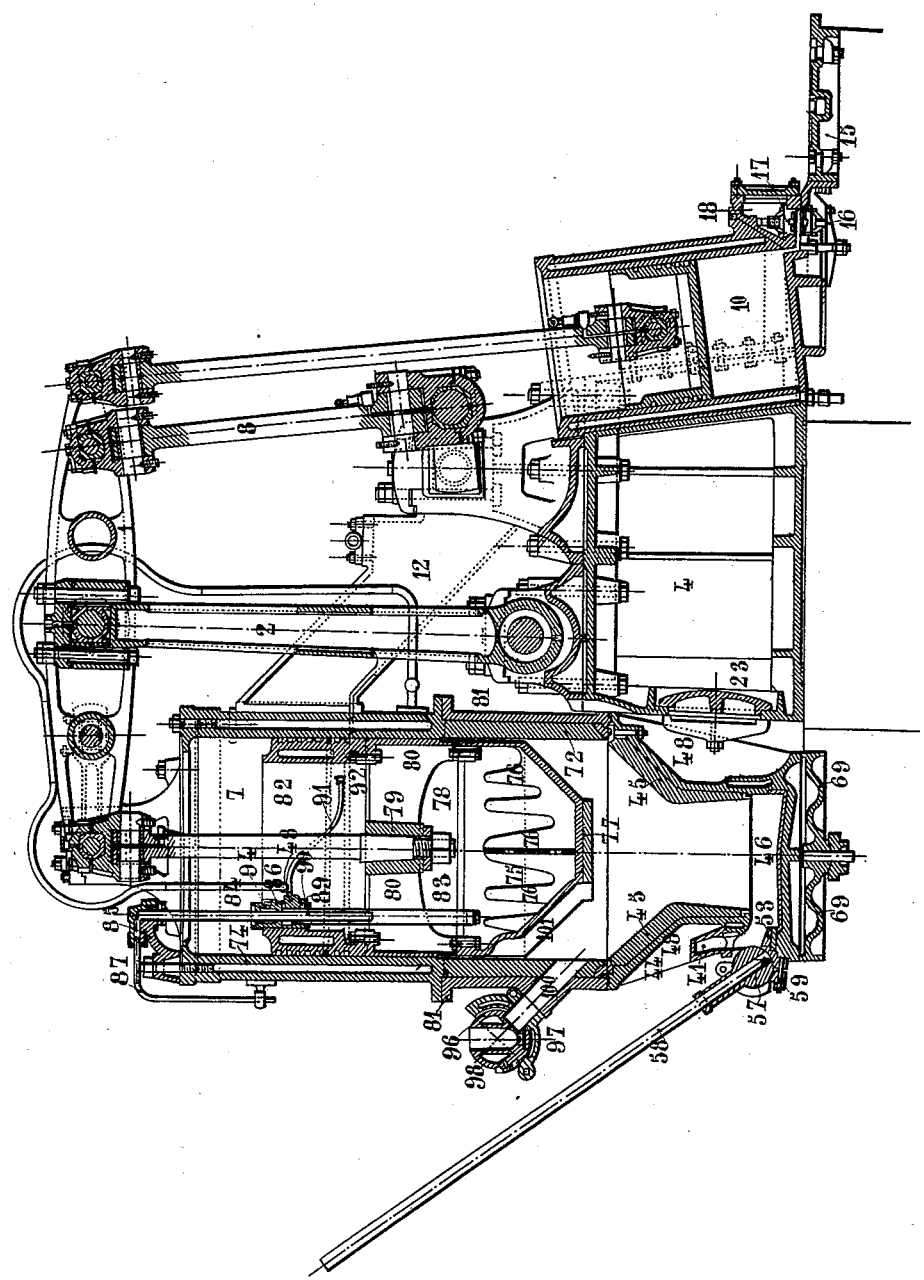

Figure 1 of the accompanying drawings represents partly in elevation and partly in longitudinal section the general arrangement of a motor with its foundations constructed according to my invention. Fig. 2 represents the motor in elevation and the foundations in transverse section. Fig. 3 is a plan of the same. Fig. 4 represents the motor in side elevation. Fig. 5 represents the motor in longitudinal section. Fig. 6 represents the motor and apparatus placed upon the foundation. Fig. 7 represents the motor cylinder in section. Fig. 8 illustrates the lower portion of the motor cylinder in section on the line A. B. C. D. Fig. 6, showing the connection between the regenerator and the admission and escape valves. Fig. 9 represents the escape valve in section drawn to a larger scale. Fig. 10 illustrates the admission valve in end elevation. Fig. 11 represents a side elevation of the same. Fig. 12 is a longitudinal elevation of the mechanism for working the escape valve. Fig. 13 is a longitudinal elevation of the mechanism for working the admission valve. Fig. 14 represents the stoking or fuel supplying apparatus in longitudinal elevation. Fig. 15 illustrates the same apparatus in end elevation. Fig. 16 illustrates the eccentric shaft of the stoking apparatus drawn on an enlarged scale. Fig. 17 represents this shaft in longitudinal elevation. Fig. 18 illustrates the exterior of the combustion chamber showing the construction and fastening of the door. Fig. 19 represents the combustion chamber in horizontal section on the line E F Fig. 18. Fig. 20 represents the combustion chamber in vertical section on the line G H Fig. 19. Fig. 21 illustrates the combustion chamber in vertical section on the line I J Fig. 19 the swivel or ball and socket arrangement for the stirring instrument being omitted. Fig. 22 represents in longitudinal section the swivel with the end of the stirring instrument or poker. Fig. 23 represents the same in end elevation. Fig. 24 illustrates the shape of the extremity of the poker. Fig. 25 is a front elevation of the combustion chamber door the cap or cover of the swivel or socket of the poker being removed. Fig. 26 represents the same in transverse section. Fig. 27 represents the door in plan. Fig. 28 represents the door in horizontal section. Fig. 29 represents the cap of the ball and socket swivel in vertical section. Fig. 30 represents the same in horizontal section. Fig. 31 is a longitudinal elevation of the eccentric pin or axis of the cap. Fig. 32 is an end view of the same. Fig. 33 is a front view of the door with the cap and eccentric pin in position. Fig. 34 is a transverse section of this combination showing the swivel and poker. Fig. 35 illustrates this combination in plan without the swivel and poker.

Fig. 36 is a horizontal section showing the position occupied by the ball or swivel arrangement between the door and the cap.

The illustrations of the general arrangement Figs. 1 to 3 represent the motor proper fixed with its base on the level of the ground upon a foundation in which are arranged an air chamber and an apparatus for heating the compressed air. The motor is of the beam engine type. The beam marked 1 in the drawings in place of being suspended on a fixed center is supported by a strong vertical arm or rod 2 capable of oscillating on a fixed axis 3 working in bearings on the bed plate 4. That arm of the beam which is connected to the piston rod is connected at about the middle of its length by two small lateral rods or links 5 to two pins 6 rigidly attached to the upper part of the motor cylinder 7. Under these conditions the extremity of the beam is compelled to travel practically in a straight line and the necessity for connecting the beam to the piston by means of a jointed connecting rod is obviated the joint at the lower end of such connecting rod being difficult to lubricate and keep in order. This arrangement also obviates the oblique thrust upon the piston which produces vibrations and tends to cause the cylinder to wear oval. The other extremity of the beam is connected to two rods 8 and 9; the rod 8 imparts rotary motion to the horizontal shaft of the engine and the rod 9 works an air compressing pump 10. Figs. 4 and 5 illustrate the manner in which the bearings of the horizontal shaft and of the oscillating arm 2 are arranged upon the hollow bed plate 4 which forms a chamber for the compressed air. The motor cylinder 7 which is provided at its upper part with the fixed pins 6 for guiding the beam is firmly fixed in a vertical position being supported laterally by two hollow struts 11 and longitudinally by two stays or inclined legs 12 which enable it to resist the oblique strain which is produced in working the engine and is transmitted to the cylinder by the links 5. By means of this arrangement great strength is imparted to the whole structure while all the parts are rendered easily accessible.

I will now proceed to describe one by one the several parts of the motor to which my improvements relate and in this description I will follow the course of the air from the time when it is drawn in from the atmosphere until it is discharged from the motor, describing successively in the order in which they present themselves the different pieces of mechanism and apparatus met with or traversed by the said air or gases of combustion in their passage through the motor.

In order to obviate the noise which would be produced by drawing air direct from the engine house the air pump 10 is supplied from a large chamber 13 arranged below the level of the floor and communicating with the external atmosphere through an underground pipe 14 (Fig. 1). This air chamber acts in the same way as the air chamber of a pump by regulating the flow of air through the pipe 14 and thus obviating the noise which would be caused by a sudden or intermittent rush of air. A circular manhole provided with a cover 15 is provided for examining and cleaning out the chamber 13. The air thus drawn in by the pump passes through the suction valves 16 (Figs. 5 and 6) and delivery valves 17 which may be of any suitable form. The delivery valves are arranged above the suction valves in the interior of the semicircular gallery 18 cast in one with the air pump cylinder and by which the latter is connected to the chamber 4. The pump cylinder Fig. 5 is provided with a jacket in which water is caused to circulate in order to absorb the heat resulting from the compression of the air. The air being suitably cooled passes through the circular passage or gallery 18 into the hollow bed plate 4 which forms a reservoir or storage chamber for the compressed air. The air proceeding from the chamber 4 passes through a pipe 24 (Fig. 1) into a supplementary chamber 25 which it enters through an orifice 26 (Fig. 2). This chamber is formed by a cast iron box strengthened by ribs or webs and arranged in the foundation of the motor. The heat exchanger in which the air is received on leaving the chamber 25 is composed of a long metal pipe bent in a zig zag or sinuous form the external surfaces of which being provided with ribs in order to increase the heating surface are heated by the exhaust gases which are discharged from the motor cylinder in a heated condition. By these means the greater part of the heat which has not been expended in doing work by acting upon the motor piston is utilized for the preliminary heating of the supply of air.

The curved metal tube or worm is composed of short lengths of tube 27 (Figs. 2, 3 and 6) in the form of the letter S connected together by flanges and bolts in such a manner as to form for example three tiers of ten lengths each but I do not limit myself to these numbers. These tubes are provided, in addition to the flanges, with projections 28 which when the lengths of the tube are joined together are connected to vertical iron plates by which the three lines of pipe are firmly tied together and are enabled to be lifted in one piece. The three worms are connected at each end to a suitable collecting pipe. This combination is inclosed in a cast iron box or casing 29 supported on a fixed point at the end farthest from the engine being the end least heated by the exhaust gases and supported at its other extremity upon a ball 30 (Figs. 1, 2, 8 and 9) which being capable of rolling on a flat or slightly concave surface, enables the cast iron box to expand under the influence of the high temperature of the exhaust gases which pass through it being discharged from the motor cylinder through an exhaust pipe 31 (Figs. 2, 8 and 9). The special action of this exhaust pipe and its connection with the box or casing of the regenerator and exhaust valve are hereinafter more fully described. This casing is protected internally by a fire-brick lining 32 which preserves it from contact with the hot gas and resists the high temperature so that the metal sides of the casing are simply required to resist the slight pressure of the exhaust gases and act as a frame or support for the firebrick lining. Before it enters the motor cylinder the compressed air is compelled to traverse the whole length of the worm 27 while the flames heat the ribs or webs on the exterior of the worm the said ribs or webs being arranged vertically as represented in the drawings (Fig. 2).

It is necessary to enable the combination of tubes to expand in the regenerator without injury to the points in the interior of the fireproof casing. This expansion is provided for as follows: The air proceeding from the chamber 25 enters the regenerator through a bent pipe 33 (Figs. 3 and 6). The part of this pipe immediately beyond the bend is flattened or of elliptical form in section the major-axis of the ellipse being vertical and it is then united with the extremity of the regenerator at which the air is supplied. This flattening of the tube renders it flexible for a sufficient length to enable it to accommodate itself to the elongation of the series of regenerating pipes. Throughout the whole of this length the flexible elliptical tube 33 is contained in a rigid sleeve 34 of slightly conical or taper form (Figs. 3 and 6) rigidly attached to the side of the metal casing which at this point is perforated as well as the brickwork with a hole allowing the flexible tube to pass with sufficient play or freedom. This arrangement is clearly represented in dotted lines in Figs. 1, 3 and 6 of the accompanying drawings. On leaving the regenerator the compressed air is conducted to the inlet valve through a pipe 35. The combination of bent tubes or worms is attached to the sides of the casing at the extremity nearest to the exhaust valve and is free to expand at the other extremity which is supported upon a ball and is not connected to the case except by the flexible tube 33. The tube 33 is of sufficient length to enable its flexibility to allow of the expansion of the case of the regenerator. The admission valve 36 (Figs. 8, 10 and 11) to which the compressed air is supplied at a relatively low temperature through the long pipe 35 is a double balanced valve held to its seat by a helical spring 37 and worked by one of the cams 38 (Fig. 13) on the horizontal shaft. The movement is transmitted to the valve by a combination of rods and bell crank levers as illustrated in Fig. 13. This gear is so constructed as to enable a governor 39 (Fig. 4) to cause the roller 40 to work on either of the cams 38 so as to increase or diminish the admission of air according to the variations in the speed.

The apparatus represented at $37^a$ Figs. 10 and 11 is a weighted piston in communication with the compressed air chamber of the motor. As the pressure increases or diminishes this piston rises and falls and by means of a rod $37^b$ works a valve $42^a$ which regulates the proportion of air delivered into the pipes or passages 41 and 42. After passing through the admission valve the air is divided into two portions. The first portion passes through a passage 41 (Fig. 8) at the lower part of the mass of fuel contained in the combustion chamber through which it flows thereby becoming largely increased in volume. The second part passes through the passage 42 over the combustion chamber and is used for the combustion of the carbonic oxide generated. The combustion chamber situated at the lower end of the motor cylinder is constructed in such a manner as to be capable of being readily separated or detached for examination or repairs. With this object it is placed upon four wheels (Figs. 2, 18 and 19) traveling upon rails 43 Figs. 3 and 6. The combustion chamber is placed in position by wheeling it under the cylinder and attaching it by means of a tight joint made as hereinafter described.

The combustion chamber 44 illustrated drawn to a larger scale in Figs. 18 to 21 of the annexed drawings is of the shape of a funnel of cast iron lined with fire clay 45. The bottom is enlarged or widened being formed by a basin 46 slightly convex at the center and likewise protected by a fireproof lining. Externally the lower part of the furnace is provided with a conical base 47 formed in the casting and supported upon four wheels. The whole structure is strengthened by vertical ribs 48 which enable the combustion chamber to support a considerable amount of vertical pressure without breaking. The passage 41 receiving a portion of the air from the admission valve is formed in casting in the casing of the combustion chamber. This form of combustion chamber enables the fuel to be burned without a grate. The lower part of the cast iron casing may be continually cooled at the place where it is exposed to the highest temperature by water circulating at 49. The fire proof lining is secured between two movable iron rings 50 and 51 the ring 50 being loosely supported in a corresponding recess in the lower part of the cast iron casing 44 and the ring 51 surrounding the orifice of the funnel being on a level with the edges thereof and to which it is attached by bolts such as the bolt 52 (Fig. 7). When the fire proof lining requires renewal the upper ring 51 is removed and the lining can then be readily repaired or remade. At the lower part of the combustion chamber there is a door 53 enabling the ash clinkers or fuel to be removed when required. This door requires to be tightly closed and to be capable of resisting the pressure of the compressed air inside the combustion chamber. The door is made tight by means of arrangements illustrated in detail in Figs. 18 to 36 of the annexed drawings.

The door in place of being flat is formed with a cylindrical part of the same radius or curvature as the external casing of the combustion chamber to which it is accurately fitted. This door being placed in position is pressed to its seat or bearings on the one hand by a forked bar 50ª (Figs. 18 and 19) jointed at one extremity to a fixed lug cast on the outer casing of the combustion chamber and at the other extremity to two lugs 54 on the door. On the other side the door is secured by a strap or stirrup 56ª likewise hinged on a fixed lug 56ᵇ cast on the external casing and provided with a pressing screw 55 (Fig. 19) which bears against a projection 56 on the door. By these means the pressures exerted upon the lugs and the projection 56 on the door are always equal and directed in such a manner that the resultant of the said pressures passes through the center of the area of the door and is normal or perpendicular to the latter. In other words the door may be described as being pressed against the cylindrical surface of the combustion chamber in the same way as a belt is pressed against the rim of a pulley and the pressure is uniformly distributed on the joint independently of the way in which the tightening up is performed. The door thus constructed can be employed to obtain access to the combustion chamber only during stoppages of the motor and when there is no pressure in the said chamber. It is also necessary to provide means for loosening from the exterior the mass of clinkers that is formed in the combustion chamber and without stopping the motor as they would otherwise run together under the mass of burning fuel and end by choking up the passage for the air. With this object there is provided on the outer side of the door hereinbefore described a ball and socket swivel 57 through the axis of which passes a poker or stirring instrument 58 which is consequently capable of lateral motion upon the axis of the said swivel. The latter is formed by a ball or sphere working in a corresponding cavity or recess formed in two parts one of which is formed in casting upon the door itself. The other part consists of a cast iron cap 59 provided with two lugs 60 perforated with oval holes through which is passed a pin or rotary shaft rotated by means of a handle 61. The trunnions 62 (Figs. 31 and 32) of this shaft work in the two lugs 63 cast on the door but the central part of the axis working in two lugs 60 on the cap is eccentric by a few millimeters to the axis of the said trunnions. The lower side of the cap is perforated with a hole (Figs. 33 and 34) through which passes loosely a retaining bolt 65 (Figs. 26 and 34) provided with nuts and washers 66 and by means of which the cap is connected to the door. By means of these arrangements the swivel or ball 57 can be enabled to rotate freely when the poker is employed for stirring the fire and can be firmly tightened in the position represented in Fig. 34 so as to prevent any escape of air when the poker is not in use. To obtain these results the apparatus is manipulated as follows: Assuming the furnace to have been charged with fuel (previously to starting the motor) and that the fire consequently does not require stirring the handle 61 (Fig. 33) is placed in a vertical position the ball and poker being in the position represented in Fig. 34. The nuts and washers 66 on the retaining bolt 65 are then permanently tightened up. Sufficient play is allowed at the joints to enable the spherical surfaces to be brought into close contact during this tightening operation so that the aperture provided for the passage of the poker is effectually closed and no leakage of air can take place. In order to work the poker while the parts are thus tightened up, it would be necessary to exert considerable force but by slightly raising the handle 61 rotary motion is imparted to the eccentric pins 62, 64 so as to cause the two lugs 60 to move away from the door. By thus temporarily loosening the cap the axis of the ball may be caused without great effort to turn in different directions so as to generate a variety of conical surfaces having the center of the ball as their apex and these displacements being combined with a sliding or longitudinal movement of the poker in the ball enable the point of this tool to reach all parts of the combustion chamber situated within a field of action determined by cutting away more or less of the hemispherical surfaces between which the ball rotates. The fire being cleared or stirred the poker is raised as represented in Figs. 5 and 34 and the handle 61 is forced down in order to tighten the cap. The poker may then be withdrawn and laid aside. All the parts of the combustion chamber hereinbefore described are supported upon four wheels (Fig. 19) traveling upon rails 43 (Figs. 2 and 3). In order to place the combustion chamber in position it is placed below the motor cylinder and in the axis of the latter. When in this position it is immediately over a cast steel disk 69 (Figs. 5 and 7). The body of this disk is provided with concentric corrugations which impart to it a certain amount of elasticity. The circumference of the disk bears against the under side of the base 47 of the combustion chamber. The center of the disk 69 is supported upon the center of a strong beam supported at both ends by bolts 71 suspended from the bed plate 4 of the motor. As indicated in Fig. 7 the bearings of these parts are of spherical form and the holes through which the rods or bolts are passed are tapered or conical to allow of oscillation. When the nut of either of the bolts 71 is tightened powerful pressure is exerted upon the joint between the combustion chamber and the cylinder. In order to enable it to support this pressure which tends to crush it the sides of the combustion chamber are provided with webs 48. The joint between the lower edge of the cylinder and the upper edge of the combustion chamber is packed with a composition of asbestos and plumbago which is powerfully compressed by the thrusting action exerted upon the combustion chamber by the steel spring disk 69. By means of this arrangement the combustion chamber is enabled to expand freely in a vertical direction without breaking any of the parts the sole effect of the expansion being to slightly increase the deflection of the disk 69 and thus increase the pressure upon the asbestus packing.

The motor cylinder is made in two parts. The lower part 72 is lined with fire clay. Its length is equal to the stroke of the piston and it is provided with admission ports 42 and exhaust ports 73 and with the opening through which the fuel is introduced (Fig. 5). The upper part 74 is bored out and is cooled by a water jacket. This second part attached to the first part by bolts is connected to the struts 11 (Fig. 7). On the top of this cylinder is bolted a cast iron ring carrying the supports of the pin 6 of the links 5 (Fig. 7). The piston being in the form of a hollow plunger is made in three parts bolted together in the interior. The lower part 75 is of cylindro conical form and its under side fits into the conical part 45 of the combustion chamber as closely as possible in order to reduce the waste space but at the same time allowing a certain amount of play when the piston is at the end of its stroke. This lower part of this piston is exposed to the greatest heat being in immediate contact with the flame and in order to preserve it from burning or overheating it is provided internally with a suitable number of vertical ribs or webs 76 presenting a large surface in contact with the external atmosphere so as to cool the metal as much as possible. The metal part 78 of the piston is utilized for rigidly connecting the piston to its rod which engages with a conical socket 79 connected to transverse arms 80. This connection does not require to be jointed owing to the peculiar arrangement of the main beam hereinbefore described. Consequently there is no joint requiring lubrication in the interior of the piston this being an important advantage the temperature at the lower part of the piston being too high to admit of the use of lubricants. The two parts 75 and 78 of the piston are of a diameter slightly less than the internal diameter of the cylinder so that they do not rub against the sides of the latter but leave a narrow annular space 81 between the two cylindrical surfaces. The piston is made tight solely by the third part or upper section 82 which is provided with suitable metal packing or junk rings. The piston is made of such a length that when it is at the upper part of its stroke the two lower parts which are unprovided with packing fill the bored part 74 of the cylinder which is exposed by the ascent of the upper section 82 of the piston. This metal surface is thus effectually protected from direct contact with the flame which would otherwise be liable to produce erosions. In order to further protect this metallic surface cold air may be injected into an annular groove formed above the first segment. This compressed air tends to escape upward into the atmosphere and downward into the combustion chamber between the piston and the cylinder. This air being under greater pressure than the pressure in the cylinder and in the combustion chamber it is impossible for the flames and dust to escape between the piston and the cylinder. This cold air is injected by placing the groove in the piston continuously in connection with the main compressed air chamber of the motor by means of the arrangement hereinafter described.

In the interior of the motor piston there is a vertical tube 83 (Fig. 5) closed at its lower end and moving with the piston. In this tube works another tube 84 of smaller diameter which is stationary being secured at its upper part to a bracket 85 bolted to the cast iron ring on the top of the cylinder. This second tube works in glands 86 like the plunger of a pump and introduces into the first tube a continual supply of compressed air which is supplied from the air chamber by a pipe 87. The interior of the tube 83 communicates through a pipe 92 with the groove 91 into which the air under pressure is injected. This compressed air flows into the said groove and into the annular space 81 and clears and cools the sides of the cylinder and of the piston. The water employed for cooling the acting surface of this piston is supplied through a tube provided with flexible parts made of india rubber and carried along the beam. After circulating in the double casing or hollow sides of the piston the water is discharged through a pipe similar to that by which it was introduced.

The apparatus for introducing the fuel is arranged upon the motor cylinder. This fuel is introduced by hand into the combustion chamber as required by means of the charging or stoking apparatus illustrated in the general view Fig. 5 and in detail drawn to a larger scale in Figs. 14 to 17 of the drawings. This stoking or fuel feeding apparatus is constructed with a hollow cylinder 96 turned and fitting accurately in a half cylinder 97 of cast iron with hollow sides cooled by a current of water. In order to introduce a charge of fuel into the combustion chamber the fuel is placed in a cavity 98 (Fig. 5) and by means of a crank handle 99 the cylinder 96 is rotated upon its axis through the required angle, so as to invert it and cause the cavity 98 to coincide with an inclined passage under it. Under these conditions the fuel slides down the incline and falls into the combustion chamber. The under side of the piston is provided with a recess 101 opposite to the feed opening 100 so that the latter may not be closed by the piston when it is at the bottom of its stroke. The hollow rotary cylinder 96 is pressed to its semi-cylindrical seat 97 by means of the arrangement next hereinafter described. On two fixed centers 102 (Figs. 14 and 15) are pivoted two levers 103 which transmit to the axis or journals 104 of the cylinder the pressure which they receive from two rods 105 connected to their extremities by nuts and washers 106. These rods are provided at their other extremity with eyes in which work the eccentric ends 108 (Figs. 16 and 17) of a shaft 107 which acts in exactly the same way as the shaft 62 of the ball and socket joint of the stirring mechanism hereinbefore described. In other words the angle of the eccentric part 108 relatively to the axis of the handle 109 is so arranged that when this handle is lowered into the vertical position represented in Figs. 14 and 15 it exerts the maximum amount of traction on the rods 105 and the rotary cylininder 96 of the charging apparatus is powerfully forced down onto its seat 97. In this closed position it is necessary to make a tight joint so that no leakage can take place. This leakage is only prevented by tightening the parts as described which renders it extremely difficult to work the crank 99 so that when it is necessary to introduce the charge of fuel the lever handle 109 must be lifted. The rotary motion thus imparted to the shaft 107 and to the eccentric ends 108 loosens slightly the rods 105 and enables the journals 104 of the charging cylinder 96 to rotate freely in their bearings. When the fuel has been introduced and the cylinder brought back to the closed position the parts are tightened up by lowering the handle 109. The gases after acting on the motor piston are discharged into the casing 29 of the regenerator through a valve which is opened by a motor at the required intervals. The construction of a durable valve for this purpose presents peculiar difficulties. The exhaust valve must always fit perfectly tight. During the exhaust it is exposed to a kind of blow pipe jet which would very rapidly burn and destroy an ordinary gas valve. Moreover the exhaust carries with it mechanically a quantity of particles of carbon, of dust and of sparks which would be liable to get between the rubbing surfaces of the guides causing them to bind, or stick and would be liable to stop between the valve and its seat so as to prevent it from closing properly. These disadvantages are obviated by constructing the exhaust valve of the improved motor as illustrated in detail in Fig. 9 of the accompanying drawings. The valve proper marked 110 is in the shape of a metal bottle through which a current of cold water is caused to flow it being introduced at the lower part through a vertical pipe at 111 and escaping at the upper part through a pipe 112 after having cooled the sides of the valve. In Fig. 9 the valve is represented as being in the raised or open position. In closing it descends and rests upon its seat 113 thus cutting off a communication between the space 114 through which the gases are discharged and the exhaust chamber 115. The valve is guided by means of two metallic linings made in segments one of which surrounds the lower part of the valve while the other surrounds the upper part which is of smaller diameter and corresponds to the rod in an ordinary valve. The lower lining is capable of sliding vertically in the casing in the same way as the piston of a steam engine and works in a cylindrical opening bored out in the valve box and cooled by a current of water circulating at 116. The upper lining works in a similar manner in a sleeve forming a tight joint with the valve box. The valve is brought down on to its seat by the action of compressed air supplied from the air chamber through a small pipe 117 acting in the space 118 upon the annular shoulder formed by the difference in the diameters of the two parts of the valve. At the upper part of this valve there is fixed a stirrup 119 into which projects one arm of a bell crank lever 120 (Fig. 12) which bears upon the lower extremity of an adjustable screw 121. This lever receiving oscillating motion from a cam 122 by the intervention of a connecting rod 123 lifts and opens the exhaust valve and allows it to descend and close at the required intervals. The lift of the valve 110 is equal to one quarter of the diameter of the orifice which it covers or in other words its stroke is made as short as possible. The capacity of the space 114 surrounding the valve is also made as small as possible in order to reduce the waste space to a minimum but its shape is designed with a view to guiding the exhaust gases in a most advantageous manner. When the valve is raised the exhaust gases rush through the port 73 and are divided into two lateral currents by a spur or projection 124. Each of these currents being caused to flow around half the circumference of the valve the area of the vertical section of the two halves of the annular passage 114 being symmetrical relatively to the plane of section in Fig. 9 must diminish according to the same law as the number of streams of gas traversing the said section—that is to say, in proportion to the distance traversed in the half circumferences so as to reach a minimum at 114*. The exhaust gases draw with them into the passage 114 a stream of sparks which in time would injure the valve 110. This injury is not produced owing to the valve being drawn up into the lower section of the guiding cylinder where it is protected from the flame and dust during the whole of the period of the exhaust. The lower end only which serves to direct the gaseous current is unprotected but presents a rough surface of cast iron which is continually cooled and is consequently not liable to be injured by the impact of the particles of solid matter. These particles cannot accumulate upon the seat of the valve which is purposely made very narrow and inclined. The continued escape of air entering the space 118 prevents the dust and hot gases from entering the segments and the lower part of the valve guides. This escape of air constitutes a species of protecting sheath around the valve especially during the ascent and descent of the valve owing to the excess of pressure in the air chamber acting at 118 against the pressure of the exhaust acting at 114. In addition to reducing the waste space to a minimum this arrangement of the exhaust valve presents the following advantages namely: No counter spring is required and the valve guides are easily lubricated not being liable to become choked with dust. Moreover the force required to open the valve is always equal to the pressure exerted in the annular space due to the difference in the diameters of the two fitted parts forming the guides. This force is independent of the pressure existing in the cylinder at the end of the stroke. It does not cease suddenly at the moment of opening the valve as in an ordinary valve constructed with a rod or stem.

The details of the construction and working of the exhaust valve have been described at considerable length because they are of the utmost importance with regard to the working of the motor in practice.

The exhaust gases after passing the valve 110 enter a chamber 115 provided with a fire proof lining. As stated at the commencement of this description the hot exhaust gases are employed for heating the regenerator to which they are conducted by a pipe made of large diameter in order to present as little resistance as possible to the flow of the gases. If the chamber 115 and the casing 29 of the regenerator were simply connected by a rigid pipe with rigid joints all this part of the motor would be liable to be dislocated in working owing to the relative displacements and unequal expansion caused by the change of temperature of the different parts. This disadvantage is obviated by constructing the connecting pipe with joints so arranged as to provide for the relative displacement in any direction of the chamber 115 relatively to the generator 29 and at the same time to enable the pipe to expand in the direction of its length without tending to separate these two parts of the motor. In order to obtain these two results the cast iron exhaust pipe 31 is provided at its upper extremity with a ball and socket joint 125 working in a socket 126 packed with asbestus and bolted to the under side of the chamber 115. At its lower extremity this pipe 31 works in a stuffing box 127 provided at its lower part with a ball and socket joint 128 working in the same way as the joint 125 in a socket 129 packed with asbestus and fixed on the cover of the metal casing of the regenerator. Under these conditions when the chamber 115 and the regenerator are displaced relatively to one another the ball and socket joints 125 and 128 turn in their packed sockets and the tube 31 is also free to expand and contract in the direction of its length by sliding in the stuffing box 127. This tube is protected internally by a fire proof sleeve or lining 130. On referring to Fig. 9 of the drawings it will be seen that all these arrangements although apparently complicated can be easily constructed and taken apart. The gases thus conducted into the casing of the regenerator are compelled to pass through the latter from one end to the other being caused to flow between the vertical webs of the worm before escaping into the chimney. It will be seen that in this passage the exhaust gases circulate in the casing of the regenerator in the opposite direction to the compressed air flowing in the cast iron pipe or worm. This circulation in opposite directions is highly favorable to the exchange of heat.

It has been shown that a great number of the parts of the improved aerothermic motor are cooled by a circulation of water. One of the chief advantages of this class of motor is that they do not consume this liquid being worked solely by the fuel and air.

It is consequently advantageous in places where water is scarce to enable the same quantity of water to circulate continually for cooling the parts loss from leakage being made good from time to time. It is consequently advisable in erecting a motor according to this invention to provide a tank or reservoir of sufficient capacity to enable the water heated by the circulation to remain in the tank for a sufficient time to enable it to be cooled before it returns to the motor. This tank is not represented in the accompanying drawings but it will be readily understood that it may be arranged in the same way as the tanks frequently employed in connection with gas engines.

The invention is not limited as to the forms, dimensions, proportions and details of construction illustrated by way of example in the accompanying drawings.

Having now particularly described and ascertained the nature of my said invention and in what manner the same is to be performed, I declare that what I claim is—

1. In an aerothermic motor, the combination with a motor-cylinder and a movable combustion chamber, of means for fixing the same firmly in position comprising a corrugated flexible plate, swiveled rods, and a beam suspended by said rods and adapted to engage and force the flexible corrugated plate against the combustion chamber, substantially as described.

2. In an aerothermic motor, the combination with a motor-cylinder, of an exhaust valve mechanism, comprising a valve seat, a cylinder of the same diameter as the valve seat, a smaller cylinder arranged above the first named cylinder and separated therefrom so as to leave an annular space, and a hollow valve movable in said cylinders, means for admitting water to said hollow valve, and means for admitting compressed air to the annular space between the two cylinders, substantially as described.

3. In an aerothermic motor, the combination with an exhaust valve casing, and a regenerator or exhaust chamber, an exhaust pipe having ball and socket joint connections with said valve casing and said regenerator or exhaust chamber and a stuffing box provided in one of the ball and socket joints within which stuffing box the exhaust pipe is capable of sliding whereby its length may be expanded and contracted, substantially as described.

4. In an aerothermic motor, the combination with a motor-cylinder, of an exhaust valve and a jointed expansible exhaust pipe communicating therewith.

In testimony whereof I have signed this specification in the presence of two subscribing witnesses.

LUCIEN GENTY.

Witnesses:
W. JON,
O. MERILLARPE.